United States Patent
Zhang et al.

(10) Patent No.: US 9,029,013 B2
(45) Date of Patent: May 12, 2015

(54) ELECTROACTIVE COMPOSITIONS WITH POLY(ARYLENE OXIDE) AND STABILIZED LITHIUM METAL PARTICLES

(71) Applicant: UChicago Argonne LLC, Chicago, IL (US)

(72) Inventors: Zhengcheng Zhang, Naperville, IL (US); Shengwen Yuan, Chicago, IL (US); Khalil Amine, Oak Brook, IL (US)

(73) Assignee: UChicago Argonne, LLC, Chicago, IL (US)

( * ) Notice: Subject to any disclaimer, the term of this patent is extended or adjusted under 35 U.S.C. 154(b) by 66 days.

(21) Appl. No.: 13/800,938

(22) Filed: Mar. 13, 2013

(65) Prior Publication Data

US 2014/0272567 A1    Sep. 18, 2014

(51) Int. Cl.
*H01M 4/36* (2006.01)
*H01M 4/60* (2006.01)

(52) U.S. Cl.
CPC .............. *H01M 4/364* (2013.01); *H01M 4/606* (2013.01)

(58) Field of Classification Search
None
See application file for complete search history.

(56) References Cited

U.S. PATENT DOCUMENTS

| | | | |
|---|---|---|---|
| 5,753,388 A | 5/1998 | Koksbang et al. | |
| 5,851,696 A | 12/1998 | Saidi et al. | |
| 6,168,884 B1 | 1/2001 | Neudecker et al. | |
| 6,221,531 B1 | 4/2001 | Vaughey et al. | |
| 6,337,159 B1 | 1/2002 | Peled et al. | |
| 6,682,823 B2* | 1/2004 | Okada | 428/448 |
| 6,706,447 B2* | 3/2004 | Gao et al. | 429/231.4 |
| 7,276,314 B2 | 10/2007 | Gao et al. | |
| 7,390,594 B2 | 6/2008 | Belharouak et al. | |
| 7,919,207 B2 | 4/2011 | Belharouak et al. | |
| 8,021,496 B2 | 9/2011 | Yakovleva et al. | |
| 8,105,719 B2 | 1/2012 | Belharouak et al. | |
| 8,158,282 B2 | 4/2012 | Zhamu et al. | |
| 8,241,793 B2 | 8/2012 | Zhamu et al. | |
| 2004/0072066 A1 | 4/2004 | Cho et al. | |
| 2007/0190422 A1 | 8/2007 | Morris | |
| 2008/0070120 A1 | 3/2008 | Miyawaki et al. | |
| 2009/0035663 A1 | 2/2009 | Yakovleva et al. | |
| 2009/0061321 A1 | 3/2009 | Yakovleva et al. | |
| 2011/0104551 A1 | 5/2011 | Yang et al. | |

(Continued)

FOREIGN PATENT DOCUMENTS

EP    2 338 622    6/2011

OTHER PUBLICATIONS

Wang et al. "Single-Ion Conducting Polymeric Electrolytes Based on Sulfonated Poly(phenylene oxide)". Journal of Applied Polymer Science, vol. 63 p. 559-563. 1997.*

(Continued)

*Primary Examiner* — Patrick Ryan
*Assistant Examiner* — Christopher Domone
(74) *Attorney, Agent, or Firm* — Foley & Lardner LLP

(57) ABSTRACT

An electroactive composition includes an anodic material; a poly(arylene oxide); and stabilized lithium metal particles; where the stabilized lithium metal particles have a size less than about 200 μm in diameter, are coated with a lithium salt, are present in an amount of about 0.1 wt % to about 5 wt %, and are dispersed throughout the composition. Lithium secondary batteries including the electroactive composition along with methods of making the electroactive composition are also discussed.

20 Claims, 8 Drawing Sheets

(56) References Cited

U.S. PATENT DOCUMENTS

2011/0226987 A1* 9/2011 Yakovleva et al. ......... 252/182.1
2012/0080648 A1 4/2012 Abouimrane et al.

OTHER PUBLICATIONS

Jarvis et al., "A lithium ion cell containing a non-lithiated cathode,", J. Power Sources 146 (2005) pp. 331-334.
Jarvis et al., "A prelithiated carbon anode for lithium-ion battery applications," J. Power Sources 162 (2006), pp. 800-802.
Li et al.,"Effective enhancement of lithium-ion battery performance using SLMP," Electrochemistry Communications 13 (2011), pp. 664-667.
Liu et al., "Prelithiated Silicon Nanowires as an Anode for Lithium Ion Batteries," ACS Nano, vol. 5, No. 8, (2011), pp. 6487-6493.
Scott et al., "Chemical Formation of a Solid Electrolyte Interface on the Carbon Electrode of a Li-Ion Cell," J. Electrochem. Soc., vol. 145, No. 5, (1998), pp. 1506-1510.
Sun et al., "Hard carbon/lithium composite anode materials for Li-ion batteries," Electrochimica Acta 52 (2007), pp. 4312-4316.

* cited by examiner

ELECTROACTIVE COMPOSITIONS WITH POLY(ARYLENE OXIDE) AND STABILIZED LITHIUM METAL PARTICLES

GOVERNMENT RIGHTS

The United States Government has rights in this invention pursuant to Contract No. DE-AC02-06CH11357 between the U.S. Department of Energy and UChicago Argonne, LLC, representing Argonne National Laboratory.

FIELD

The present technology is generally related to anodes containing stabilized lithium metal powder, and to lithium secondary batteries including such anodes. More specifically, the present technology relates to a partially lithiated anode electrode that can diminish the first cycle irreversible capacity loss and a partially/fully lithiated anode electrode that can enable the usage of non-lithiated cathode electrode in a lithium secondary battery.

BACKGROUND

Lithium ion batteries having a high energy density and high voltage are commercially available and widely used. The electrode used in a lithium ion battery is a key factor influencing the performance of the cell. Anode electrodes usually have an intrinsic first cycle irreversible capacity loss due to the formation of a solid electrolyte interphase (SEI) along with other irreversible reactions between lithium and the anode. This first cycle irreversible capacity loss consumes valuable lithium from the more expensive cathode materials. The degree of first cycle irreversible capacity loss varies depending on the nature of the active materials, other components in the battery, and the preparation of the anode. This value ranges from 10 to 30 percent for anodes based on carbon materials, and can be substantially higher for anodes based on other types of active materials, such as tin, selenium, and silicon. As such, the first cycle irreversible capacity loss substantially increases the cost of lithium ion battery fabrication and yields a larger dead weight within the lithium ion battery.

To further enhance the energy density of secondary lithium batteries, a wide range of non-lithiated cathode materials, such as sulfur, $V_6O_{13}$, $V_2O_5$, $MnO_2$, and $FeSe_2$, have been investigated. High capacity cells have been demonstrated when using non-lithiated cathode materials with lithium metal as the anode. However, direct use of lithium metal as an anode is not safe due to dendrite formation that causes shorts in the cell. Therefore, several approaches have been developed in order to enable non-lithiated high capacity cathode materials. These approaches generally fall into two categories: (1) prelithiation of the anode in order to remove the first cycle irreversible capacity loss; or (2) modification of the lithium metal to improve its cycle performance and safety when incorporated with an anode.

Prelithiation of the anode is performed via the following two approaches: (i) adding n-butyllithium (or another lithium-containing chemical) onto an anode laminate and subsequently washing the laminate with a hydrocarbon solvent such as hexane to remove any unreacted chemicals and unwanted products; or (ii) attaching a lithium foil onto the surface of anode laminate and subsequently adding an electrolyte to initiate the lithiation reaction. After a certain period of time, the residual lithium foil is removed. Through controlling the lithiation time and/or weight of lithium foil, one can obtain electrodes with different degrees of lithiation. The prelithiated anode electrodes made by these approaches may then be used for battery assembly. While these two approaches illustrate that an anode can be prelithiated, they are difficult to scale up for industrial battery fabrication.

Stabilized lithium metal powder (SLMP), a lithium powder coated with either a thin layer of a lithium salt or wax as a protection layer, has also been investigated as the lithium source for the lithiation of anode electrodes. The lithium salt coated SLMPs have been found to be incompatible with N-methylpyrrolidinone (NMP), dimethylformamide (DMF), and dimethyl acetamide (DMA) in attempting to generate slurries of electroactive materials—in fact, attempting to generate a slurry of lithium salt coated SLMPs and NMP results in a highly dangerous exothermic reaction. Unfortunately, NMP, DMF, and DMA are the three commonly used solvents for the most widely used binder in lithium ion cells, polyvinylidene fluoride (PVDF). To circumvent this, a surface spray coating approach was developed where SLMPs with either a lithium salt layer or a wax layer are spray coated onto the surface of a pre-made anode laminate, followed by carlendering the laminate to break the surface coating layer of the SLMP. The anode is then prelithiated in situ upon addition of an electrolyte. However, this surface spray coating approach is difficult to scale up because the surface spraying technique suffers from clogging issues.

SUMMARY

In an aspect, an electroactive composition is provided that includes an anodic material; a poly(arylene oxide); and stabilized lithium metal particles; where the stabilized lithium metal particles have an average size of less than about 200 µm in diameter, are coated with a lithium salt, are present in an amount of about 0.1 wt % to about 5 wt %, and are dispersed throughout the composition. In some embodiments, the poly (arylene oxide) includes a compound according to Formula I:

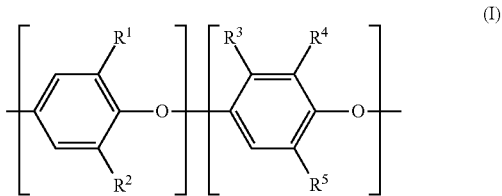

where $R^1$ is alkyl; $R^2$ is H or alkyl; $R^3$ is $SO_3X$ or $C(O)OY$; $R^4$ is $CH_2R^6$; $R^5$ is H or alkyl; $R^6$ is H, $OC(O)R^7$, cyano, or $SO_3X$; X is Li, Na, K, or methyl; Y is $C(O)R^7$, alkyl, Li, Na, or K; and $R^7$ is alkyl. In some embodiments, the poly(arylene oxide) includes a compound according to Formula II or III:

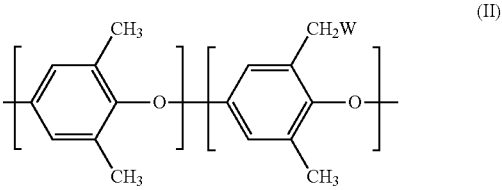

-continued

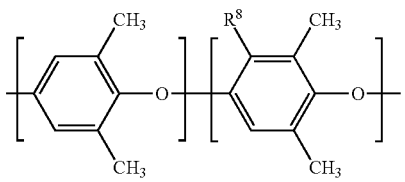

(III)

wherein $R^8$ is $SO_3X$ or $C(O)OY$; W is H, cyano, or $OC(O)R^7$; X is Li, Na, K, or methyl; Y is $C(O)R^7$, alkyl, Li, Na, or K; and $R^7$ is alkyl. In some embodiments, W is H, CN, $OC(O)CH_3$, $OC(O)CH_2CH_3$, $OC(O)CH_2CH_2CH_3$, $OC(O)CH(CH_3)_2$, or $OC(O)CH_2CH_2CH_2CH_3$. In some embodiments, $R^8$ is $SO_3Li$ or $SO_3Na$. In some embodiments, the poly(arylene oxide) includes a compound according to Formula II. In some embodiments, the poly(arylene oxide) includes a compound according to Formula III.

In some embodiments, the anodic material includes $Li_4Ti_5O_{12}$, Sn, tin oxide, tin alloys, Se, Si, Si—C, silicon oxide, silicon alloys, Sb, intermetallic compounds, Si, Si—C, an antimony alloy, a composite tin alloy, natural graphite, hard carbon, soft carbon, carbon black, petroleum coke, artificial graphite, graphitized meso-carbon microbeads, graphite fibers, graphene, graphene oxide, carbon nanotubes, or amorphous carbon. In some embodiments, the poly(arylene oxide) is present in an amount of about 0.1 wt % to about 30 wt %.

In another aspect, a lithium secondary battery is provided that includes a cathode includes a cathode material; an anode including the previously described electroactive composition; and a non-aqueous electrolyte. In some embodiments, the cathode is a non-lithiated cathode that includes a non-lithiated cathodic material. In some embodiments, the non-lithiated cathodic material includes $MnO_2$, $V_2O_5$, $V_6O_{13}$, $MoS_2$, $FeS_2$, S, $FeF_3$, or $FeF_2$.

In another aspect, a process is provided that involves generating a slurry including an anodic material; a binder that includes a poly(arylene oxide), a liquid; and stabilized lithium metal particles; coating the slurry onto a metal substrate; and drying the slurry to provide an electroactive material; where the stabilized lithium metal particles have a size less than about 200 μm in diameter, are coated with a lithium salt, and are present in an amount of about 0.1 wt % to about 5 wt % relative to the anodic material and the binder; and where the liquid includes hydrocarbon solvents, aromatic solvents, sulfones, or sulfoxides. In some embodiments, the poly(arylene oxide) includes a compound according to Formula I, II, or III. In some embodiments, the poly(arylene oxide) is present in an amount of about 0.1 wt % to about 30 wt % relative to the anodic material and the stabilized lithium metal particles.

In some embodiments, the process further includes activating the electroactive material. In some embodiments, the activating step includes chemically, physically, or thermally activating the electroactive material. In some embodiments, the activating step includes compressing the electroactive material to achieve at least about a 10% reduction in the thickness of the electroactive material. In some embodiments, the activating step includes heating the electrode at a temperature of about 100° C. to about 220° C. for a duration of about 5 minutes to about 120 minutes. In some embodiments, the activating step includes contacting the electroactive material with a non-aqueous electrolyte. In some embodiments, the liquid includes p-xylene, mesitylene, toluene, hexane, anisole, tetrahydronaphthalene, chlorobenezene, dichlorobenzene, sulfolane, or dimethylsulfoxide.

DETAILED DESCRIPTION

Figure 1:
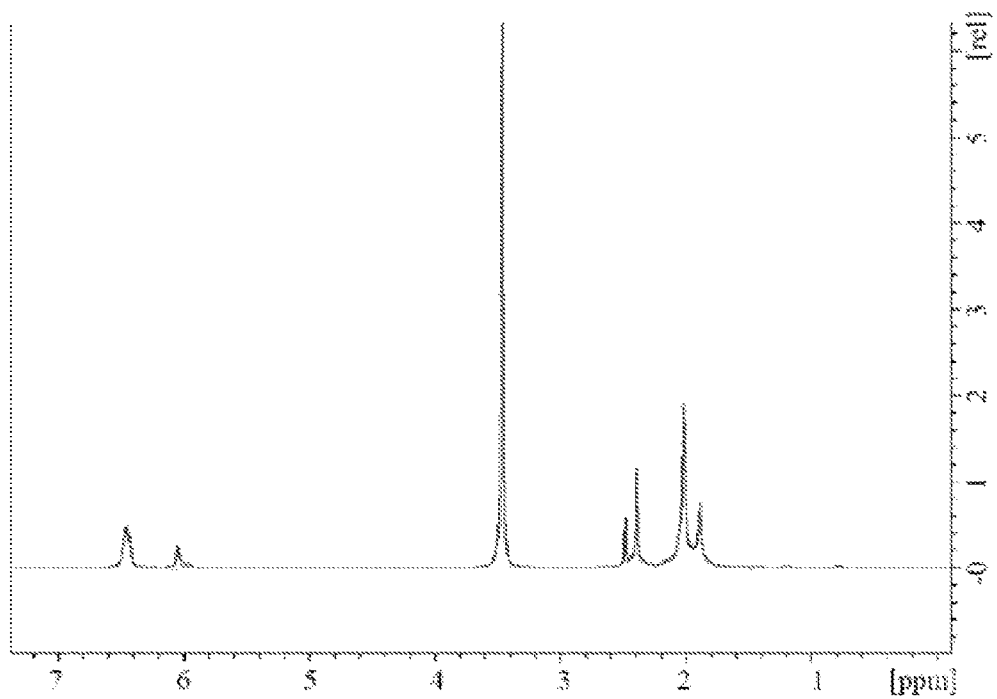
FIG. 1 is a $^1$H NMR of poly(2,6-dimethyl-1,4-phenylene oxide)sulfonic acid lithium salt, according to the Examples.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to an alkyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano (i.e. CN), alkoxy, and/or halo groups such as F, Cl, Br, and I groups.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

As used herein, "aryl" groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

Alkylene groups are alkyl groups, as defined herein, which are divalent; i.e., they have two points of attachment to a compound of the present technology. Similarly, arylene groups are aryl groups which are divalent. Each arylene will be divalent at different carbons of the aromatic ring. Representative arylene groups include, but are not limited to, o-phenylene, m-phenylene, and p-phenylene, depicted as follows:

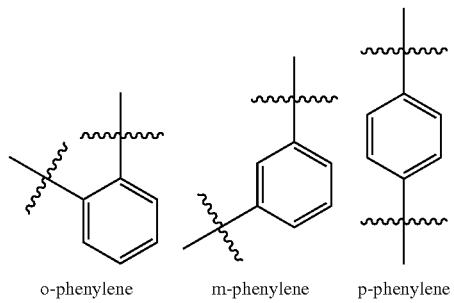

o-phenylene    m-phenylene    p-phenylene

No particular attachment or orientation of the arylene group is implied.

The present technology provides compositions and processes that are suitable for large scale production of anodic materials for lithium ion batteries. The present technology utilizes a poly(arylene oxide) to provide pre-lithiated anode materials that do not suffer from scalability issues. The use of a poly(arylene oxide) allows for the formation of the anode material by a slurry approach. The poly(arylene oxide) is a thermally stable binder that provides stability to the lithium metal source as well as improves adhesion to the metal foil. A pre-lithiated anode according to the present technology shows minimal or no first cycle irreversible capacity loss and has stable cycling performance with reversible specific capacity. An anode that is fully pre-lithiated according to the present technology may be used together with non-lithiated cathodes to produce high capacity lithium secondary batteries.

In one aspect, an electroactive composition is provided. The electroactive composition includes an anodic material; a poly(arylene oxide); and stabilized lithium metal particles, where the lithium metal particles have a size less than about 200 μm in diameter and are dispersed throughout the composition. When the electroactive composition is incorporated in a lithium ion secondary battery, the battery exhibits minimal or no first cycle irreversible capacity loss and has stable cycling performance with reversible specific capacity due to the electroactive composition.

Stabilized lithium metal particles (SLMPs) are small lithium metal particles with a thin coating that includes a lithium salt. Illustrative lithium salts include lithium carbonate, lithium oxide, lithium hydroxide, lithium phosphate, or a combination of any two or more thereof. In some embodiments, the coating is about 10 nm to about 200 nm thick on the stabilized lithium metal particle. In some embodiments, the particle size of the stabilized lithium metal particles is less than about 150 μm. In some embodiments, the particle size of the stabilized lithium metal particles is about 125 μm, about 100 µm, about 75 µm, about 50 µm, about 30 µm, about 20 µm, about 10 µm, about 1 µm, about 100 nm, or any range between any two of these values or less than any one of these values. The stabilized lithium metal particles are present in an amount of about 0.1 wt % to about 5 wt %. The stabilized lithium metal particles may be present in an amount of about 0.5 wt %, about 1 wt %, about 1.2 wt %, about 1.4 wt %, about 1.6 wt %, about 1.8 wt %, about 2 wt %, about 2.2 wt %, about 2.4 wt %, about 2.6 wt %, about 2.8 wt %, about 3 wt %, about 3.2 wt %, about 3.4 wt %, about 3.6 wt %, about 3.8 wt %, about 4 wt %, about 4.2 wt %, about 4.4 wt %, about 4.6 wt %, about 4.8 wt %, or any range between any two of these values.

In some embodiments, the poly(arylene oxide) includes a compound according to Formula I:

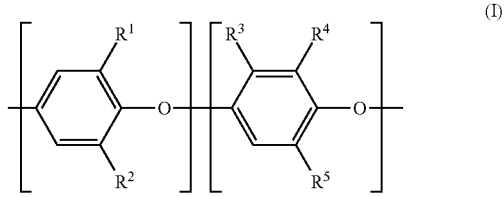

(I)

where $R^1$ is alkyl; $R^2$ is H or alkyl; $R^3$ is $SO_3X$ or $C(O)OY$; $R^4$ is $CH_2R^6$; $R^5$ is H or alkyl; $R^6$ is H, $OC(O)R^7$, cyano, or $SO_3X$; X is Li, Na, K, or methyl; Y is $C(O)R^7$, alkyl, Li, Na, or K; and $R^7$ is alkyl.

In some embodiments, the poly(arylene oxide) includes a compound according to Formula II or III:

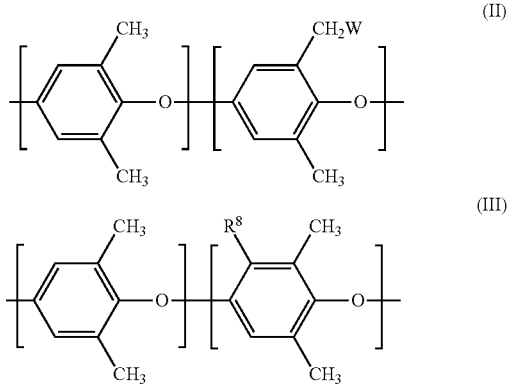

(II)

(III)

where $R^8$ is $SO_3X$ or $C(O)OY$; W is H, cyano, or $OC(O)R^7$; X is Li, Na, K, or methyl; Y is $C(O)R^7$, alkyl, Li, Na, or K; and $R^7$ is alkyl. In some embodiments of Formula II, W is H, cyano, $OC(O)CH_3$, $OC(O)CH_2CH_3$, $OC(O)CH_2CH_2CH_3$, $OC(O)CH(CH_3)_2$, or $OC(O)CH_2CH_2CH_2CH_3$. In some embodiments of Formula III, $R^8$ is $SO_3Li$ or $SO_3Na$. In some embodiments, the poly(arylene oxide) includes a compound according to Formula II. In some embodiments, the poly(arylene oxide) includes a compound according to Formula III. In some embodiments, the poly(arylene oxide) includes poly(2,6-dimethyl-1,4-phenylene oxide).

In some embodiments, the poly(arylene oxide) is present in an amount of about 0.1 wt % to about 30 wt %. The poly(arylene oxide) may be present in an amount of about 0.2 wt %, about 0.5 wt %, about 1 wt %, about 5 wt %, about 10 wt %, about 15 wt %, about 20 wt %, about 25 wt %, and any range in between any two of these values or any amount greater than any one of these values.

The anodic material may include, but is not limited to, graphite, amorphous carbon, $Li_4Ti_5O_{12}$, tin alloys, silicon alloys, intermetallic compounds, or mixtures of any two or more thereof. Suitable graphite materials may include, but are not limited to, natural graphite, hard carbon, soft carbon, carbon black (CB), petroleum coke, artificial graphite, graphitized meso-carbon microbeads (MCMB), graphite fibers, graphene, graphene oxide, carbon nanotubes, or amorphous carbon materials. Commercial examples of carbon black include, but are not limited to, Super P, Black Pearl 2000, Denka Black, Vulcan XC72R, Ketjen black. In some embodiments, the anodic material includes $Li_4Ti_5O_{12}$, Sn, tin oxide, tin alloys, Se, Si, Si—C, silicon oxide, silicon alloys (such as SiCu or SiMo), Sb, an antimony alloy, natural graphite, hard carbon, soft carbon, carbon black, petroleum coke, artificial graphite, graphitized meso-carbon microbeads, graphite fibers, graphene, graphene oxide, carbon nanotubes, amorphous carbon, or mixtures of any two or more thereof. The anodic material is present in an amount of at least about 70 wt %. The anodic material may be present in an amount of about 75 wt %, about 80 wt %, about 85 wt %, about 90 wt %, about 95 wt %, about 98 wt %, or any range between any two of these values.

In another aspect, a lithium secondary battery is provided that exhibits either minimal or no first cycle irreversible capacity loss and has stable cycling performance with reversible specific capacity. The secondary battery includes a positive electrode (cathode) that includes a cathodic material, a negative electrode (anode) that includes the previously described electroactive composition, and a non-aqueous electrolyte. The lithium secondary battery may also include a separator. Illustrative separators include, but are not limited to, polyethylene, polypropylene, or polyvinylidene fluoride (PVDF).

In addition to the previously described electroactive composition, the anode in such devices may further include, but is not limited to, graphite, amorphous carbon, $Li_4Ti_5O_{12}$, tin alloys, silicon alloys, intermetallic compounds, or mixtures of any two or more thereof. Suitable graphite materials may include, but are not limited to, natural graphite, hard carbon, soft carbon, carbon black, petroleum coke, artificial graphite, graphitized meso-carbon microbeads (MCMB), graphite fibers, graphene, graphene oxide, carbon nanotubes, or amorphous carbon materials. Commercial examples of carbon black include, but are not limited to, Super P, Black Pearl 2000, Denka Black, Vulcan XC72R, Ketjen black.

For cathodes to be used in lithium secondary batteries, the cathodic material includes lithiated materials, lithium transition metal rich oxide composites, or non-lithiated materials. For example, such materials and composites include, but are not limited to, $MnO_2$, $V_2O_5$, $V_6O_{13}$, $LiVO_3$, $MoS_2$, $FeS_2$, S, air (oxygen), $FeF_3$, $FeF_2$, a spinel, an olivine, a carbon-coated olivine, $LiFePO_4$, $LiCoO_2$, $LiNiO_2$, $LiNi_{1-x}Co_yM^4_zO_2$, $LiMn_{0.5}Ni_{0.5}O_2$, $Li_{1+x}Mn_{2-z}M^4_yO_{4-m}X^1_n$, $LiFe_{1-z}M^6_yPO_{4-m}X^1_n$, $LiMn_{1/3}Co_{1/3}Ni_{1/3}O_2$, $LiMn_2O_4$, $LiFeO_2$, $LiM^4_{0.5}Mn_{1.5}O_4$; $Li_{1+x'}Ni_\alpha Mn_\beta Co_\gamma M^5_\delta O_{2-z''}F_{z'''}$, $Li_2MnO_3$—$Li_aM_bM'_cM''_dO_e$, $Li_nB^1_2(M^2O_4)_3$ (Nasicon), $Li_2MSiO_4$, or a mixture of any two or more thereof, wherein $M^2$ is P, S, Si, W, or Mo; $M^4$ is Al, Mg, Ti, B, Ga, Si, Ni, or Co; $M^5$ is Mg, Zn, Al, Ga, B, Zr, or Ti; A is Li, Ag, Cu, Na, Mn, Fe, Co, Ni, Cu, or Zn; $M^6$ is Al, Mg, Ti, B, Ga, Si, Ni, Mn or Co; M, M', and M" are transition metals; $B^1$ is Ti, V, Cr, Fe, or Zr; $X^1$ is S or F; $0 \le x \le 0.3$; $0 \le y \le 0.5$; $0 \le z \le 0.5$; $0 \le m \le 0.5$; $0 \le n \le 0.5$; $0 \le x'' \le 0.4$; $0 \le a \le 2$; $0 \le b \le 1$; $0 \le c \le 1$; $0 \le d \le 1$; $0 \le \alpha \le 1$; $0 \le \beta \le 1$; $0 \le y \le 1$; $0 \le \delta \le 0.4$; $0 \le z'' \le 0.4$; $0 \le n' \le 3$; $0 \le a+b+c+d < 6$; $0 < e \le 4$; and $0 < \alpha+\beta+\gamma+\delta$. In some embodiments, the cathode is a non-lithiated cathode that includes a non-lithiated cathodic material. In some embodiments, the non-lithiated cathodic material includes $MnO_2$, $V_2O_5$, $V_6O_{13}$, $MoS_2$, $FeS_2$, S, air (oxygen), $FeF_3$, $FeF_2$, or a mixture of any two or more thereof.

The cathode may include a current collector and may include a polymeric binder. The current collector may include copper, stainless steel, titanium, tantalum, platinum, gold, aluminum, nickel, cobalt nickel alloy, highly alloyed ferritic stainless steel containing molybdenum and chromium; or nickel-, chromium-, or molybdenum-containing alloys. The current collector may be a foil, mesh, or screen, and the cathode material is contacted with the current collector by casting, pressing, or rolling the mixture thereto. The polymeric binder may include poly(acrylonitrile), poly(vinylidene fluoride), polyvinyl alcohol, polyethylene, polystyrene, polyethylene oxide, polytetrafluoroethylene, polyimide, styrene butadiene rubber, carboxy methyl cellulose, gelatin, or a copolymer of any two or more such polymers.

The non-aqueous electrolyte may be any conventional or otherwise suitable organic electrolyte known in the art and includes a polar aprotic solvent and a salt. A variety of solvents may be employed in the electrolyte as the polar aprotic solvent. Some illustrative polar aprotic solvents include liquids and gels capable of solubilizing sufficient quantities of the lithium salt and the redox shuttle so that a suitable quantity of charge can be transported from the positive electrode to negative electrode. The solvents can be used over a wide temperature range, e.g., from −30° C. to 70° C. without freezing or boiling, and are stable in the electrochemical range within which the cell electrodes and shuttle operate. Suitable solvents include, but are not limited to, dimethyl carbonate; ethyl methyl carbonate; diethyl carbonate; methyl propyl carbonate; ethyl propyl carbonate; dipropyl carbonate; bis(trifluoroethyl)carbonate; bis(pentafluoropropyl)carbonate; trifluoroethyl methyl carbonate; pentafluoroethyl methyl carbonate; heptafluoropropyl methyl carbonate; perfluorobutyl methyl carbonate; trifluoroethyl ethyl carbonate; pentafluoroethyl ethyl carbonate; heptafluoropropyl ethyl carbonate; perfluorobutyl ethyl carbonate; fluorinated oligomers; dimethoxyethane; digylme; triglyme; dimethylvinylene carbonate; tetraethyleneglycol; dimethyl ether; polyethylene glycols; a sulfones, a sulfite, sulfolane, γ-butyrolactone, δ-butyrolactone, dioxolane, a silane, a siloxane, N,N-dimethyl formamide, N,N-dimethyl acetamide, acetonitrile, an acetal, a ketal, esters, a phosphate ester, N-methylpyrrolidinone (NMP), a fluoro ether, a fluoro esters, fluoroethylene carbonate, or adiponitrile. Of course, a mixture of any two or more such solvents may also be used. In some embodiments, fluorinated derivatives of the above solvents may be used.

Suitable salts that may be used in the electrolytes, include, but are not limited to, $Li[B(C_2O_4)_2]$; $Li[BF_2(C_2O_4)]$; $LiClO_4$; $LiBF_4$; $LiAsF_6$; $LiSbF_6$; LiBr, $LiPF_6$; $Li[CF_3SO_3]$; $Li[N(CF_3SO_2)_2]$; $Li[C(CF_3SO_2)_3]$; $Li[B(C_6F_5)_4]$; $Li[B(C_6H_5)_4]$; $Li[N(SO_2CF_3)_2]$; $Li[N(SO_2CF_2CF_3)_2]$; $LiN(SO_2C_2F_5)_2$; $Li[BF_3C_2F_5]$; and $Li[PF_3(CF_2CF_3)_3]$; and lithium alkyl fluorophosphates.

In an aspect, a process is provided for preparing an electroactive composition. The process involves generating a slurry that includes an anodic material, a binder including a poly(arylene oxide), a liquid; and stabilized lithium metal particles; coating the slurry onto a metal substrate; and drying the slurry to provide an electroactive material. In the process, the stabilized lithium metal particles have a diameter of less than about 200 μm, are coated with a lithium salt, and are present in an amount of about 0.1 wt % to about 5 wt % relative to the anodic material and the binder. In some embodiments, the particle size of the stabilized lithium metal particles is less than about 150 μm. In some embodiments, the particle size of the stabilized lithium metal particles is about 125 μm, about 100 μm, about 75 μm, about 50 μm, about 30 μm, about 20 μm, about 10 μm, about 1 μm, about 100 nm, or any range in between any two of these values or less than any one of these values. The stabilized lithium metal particles may be present in an amount of about 0.5 wt %, about 1 wt %, about 1.2 wt %, about 1.4 wt %, about 1.6 wt %, about 1.8 wt %, about 2 wt %, about 2.2 wt %, about 2.4 wt %, about 2.6 wt %, about 2.8 wt %, about 3 wt %, about 3.2 wt %, about 3.4 wt %, about 3.6 wt %, about 3.8 wt %, about 4 wt %, about 4.2 wt %, about 4.4 wt %, about 4.6 wt %, about 4.8 wt %, or any range between any two of these values.

The poly(arylene oxide) is particularly suited to the process. Attempting to use the process with polysiloxanes or polyfluorenes such as PVDF and polytetrafluoroethylene (PTFE) fails: polysiloxanes have a low adhesion which cannot hold the laminate tightly to the metal substrate, while polyfluorenes have low solubility in the liquid and can't generate a sufficient viscosity during slurry preparation. In some embodiments, the poly(arylene oxide) includes a compound according to Formula I. In some embodiments, the poly(arylene oxide) includes a compound according to Formula II or III. In some embodiments of Formula II, W is H, cyano, $OC(O)CH_3$, $OC(O)CH_2CH_3$, $OC(O)CH_2CH_2CH_3$, $OC(O)CH(CH_3)_2$, or $OC(O)CH_2CH_2CH_2CH_3$. In some embodiments of Formula III, $R^8$ is $SO_3L_1$ or $SO_3Na$. In some embodiments, the poly(arylene oxide) includes a compound according to Formula II. In some embodiments, the poly(arylene oxide) includes a compound according to Formula III. In some embodiments, the poly(arylene oxide) includes poly(2,6-dimethyl-1,4-phenylene oxide).

In some embodiments of the process, the poly(arylene oxide) is present in an amount of about 0.1 wt % to about 30 wt % relative to the anodic material and the stabilized lithium metal particles. The poly(arylene oxide) may be present in the slurry in an amount of about 0.2 wt %, about 0.5 wt %, about 1 wt %, about 5 wt %, about 10 wt %, 15 wt %, 20 wt %, 25 wt %, and any range in between any two of these values or any amount greater than any one of these values.

The anodic material may include, but is not limited to, graphite, amorphous carbon, $Li_4Ti_5O_{12}$, tin alloys, silicon alloys, intermetallic compounds, or mixtures of any two or more thereof. Suitable graphite materials may include, but are not limited to, natural graphite, hard carbon, soft carbon, carbon black (CB), petroleum coke, artificial graphite, graphitized meso-carbon microbeads (MCMB), graphite fibers, graphene, graphene oxide, carbon nanotubes, or amorphous carbon materials. Commercial examples of carbon black include, but are not limited to, Super P, Black Pearl 2000, Denka Black, Vulcan XC72R, Ketjen black. In some embodiments, the anodic material includes $Li_4Ti_5O_{12}$, Sn, tin oxide, tin alloys, Se, Si, Si—C, silicon oxide, silicon alloys (such as SiCu or SiMo), Sb, an antimony alloy, natural graphite, hard carbon, soft carbon, carbon black, petroleum coke, artificial graphite, graphitized meso-carbon microbeads, graphite fibers, graphene, graphene oxide, carbon nanotubes, amorphous carbon, or mixtures of any two or more thereof. The anodic material is present in an amount of at least about 70 wt % relative to the binder and the stabilized lithium metal particles. The anodic material may be present in an amount of about 75 wt %, about 80 wt %, about 85 wt %, about 90 wt %, about 95 wt %, about 98 wt %, or any range between any two of these values.

As discussed regarding the electroactive composition, SLMPs are small lithium metal particles coated with a thin layer that includes a lithium salt. When SLMPs are used according to the process, the electroactive composition produces has SLMPs dispersed throughout the entire electroactive composition. The thin layer of the SLMPs may then be broken or removed by physical, chemical, or thermal activation of the electroactive composition. For example, when the electroactive composition is calendered under appropriate pressure, the protection layer of the SLMPs will break and allow the lithium metal inside to come into contact with the anodic material. Chemical activation may be achieved upon addition of any one of the previously described non-aqueous electrolytes. Without being bound by theory, it is believed a closed circuit among the lithium, the anodic material, and the electrolyte forms (similar to a shorted lithium-ion cell), and so electrochemical reactions among lithium, anodic material, and electrolyte occur immediately and very quickly. During the electrochemical reactions, a solid electrolyte interphase (SEI) on the surface of the anodic material forms along with intercalation of lithium ions into the lattice of anodic material. This activation prelithiates the electroactive material and prevents first cycle irreversible capacity loss.

Thus, the process may further include activating the electroactive material. The activating step may include chemically, physically, or thermally activating the electroactive material, or a combination of any two or more thereof. In some embodiments, the activating step involves compressing the electroactive material at a pressure from about 5 psi to about 150 psi. The pressure may be about 10 psi, about 15 psi, about 20 psi, about 25 psi, about 30 psi, about 35 psi, about 40 psi, about 45 psi, about 50 psi, about 55 psi, about 60 psi, about 65 psi, about 70 psi, about 75 psi, about 80 psi, about 85 psi, about 90 psi, about 95 psi, about 100 psi, about 105 psi, about 110 psi, about 115 psi, about 120 psi, about 125 psi, about 130 psi, about 135 psi, about 140 psi, about 145 psi, or any range in between any two of these values or any amount greater than any one of these values. For example, in some embodiments, the pressure is from about 15 psi to about 100 psi. In some embodiments, the activating step involves compressing the electroactive material to achieve at least about a 10% reduction in the thickness of the electroactive material. The reduction in the thickness of the electroactive material may be about 12%, about 14%, about 16%, about 18%, about 20%, about 22%, about 24%, about 26%, about 28%, about 30%, about 32%, about 34%, or any range in between any two of these values or any amount greater than any one of these values.

The activating step may involve heating the electroactive material at a temperature of about 100° C. to about 220° C. for a duration of about 5 minutes to about 120 minutes. Unlike PVDF and PTFE, the poly(arylene oxide) of the present technology is thermally stable and capable of being heated without decomposing and without degradation of its mechanical properties. In some embodiments, the temperature is about 100° C., 110° C., 120° C., 130° C., 140° C., 150° C., 160° C., 170° C., 180° C., 190° C., 200° C., or about 210° C. The temperature may also be any range between any two of these values. In some embodiments, the duration is about 10 minutes, about 20 minutes, about 30 minutes, about 40 minutes, about 50 minutes, about 60 minutes, about 70 minutes, about 80 minutes, about 90 minutes, about 100 minutes, about 110 minutes, or any range between any two of these values.

In some embodiments, the activating step involves contacting the electroactive material with a non-aqueous electrolyte, including any one of the non-aqueous electrolytes previously described. In some embodiments, the activating step includes compressing the electroactive material at a pressure from about 5 psi to about 150 psi and contacting the electroactive material with a non-aqueous electrolyte.

Liquids for the process include, but are not limited to, hydrocarbon solvents, aromatic solvents, sulfones, sulfoxides, or a mixture of any two or more thereof. Hydrocarbon solvents include, but are not limited to, pentane, hexane, cyclohexane, heptane, octane, or a mixture of any two or more thereof. Aromatic solvents include substituted, unsubstituted, and halogenated aromatic solvents. Illustrative aromatic solvents include, but are not limited to, o-xylene, m-xylene, p-xylene, mesitylene, toluene, anisole, tetrahydronaphthalene, chlorobenzene, dichlorobenzene, or a mixture of any two or more thereof. An illustrative example of a sulfone is sulfolane. An illustrative example of a sulfoxide is dimethylsulfoxide.

The coating step may include, but is not limited to, casting, pressing, or rolling the slurry onto the metal substrate.

The metal substrate of the process may include copper, stainless steel, titanium, tantalum, platinum, gold, aluminum, nickel, cobalt nickel alloy, highly alloyed ferritic stainless steel containing molybdenum and chromium; or nickel-, chromium-, or molybdenum-containing alloys. The metal substrate may be a foil, a mesh, or a screen.

The present invention, thus generally described, will be understood more readily by reference to the following examples, which are provided by way of illustration and are not intended to be limiting of the present invention.

EXAMPLES

General

Functionalized PPO polymers may be prepared according to Scheme 1.

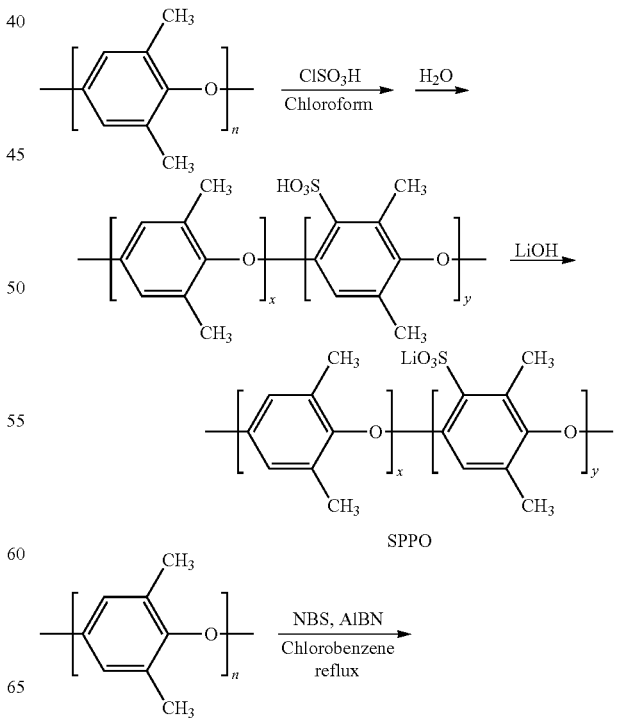

-continued

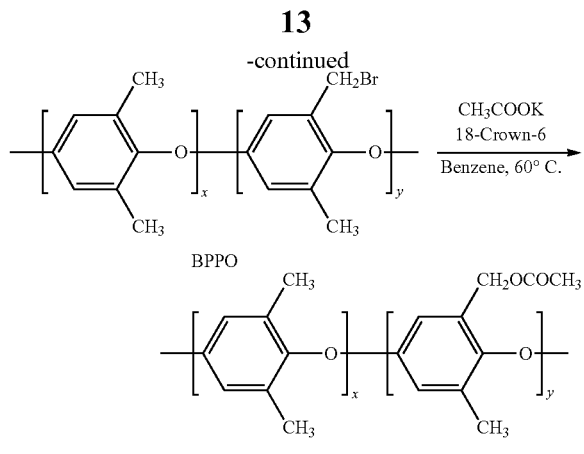

BPPO

EPPO

Example 1

Synthesis of sulfonated poly(2,6-dimethyl-1,4-phenylene oxide) (SPPO)

To a solution of poly(2,6-dimethyl-1,4-phenylene oxide) (PPO; 20 g) in chloroform (200 mL) was added dropwise chlorosulfonic acid (7 mL) with vigorous stirring by a mechanical stirrer. A solid precipitate appeared immediately. Upon completion of the addition of chlorosulfonic acid, the mixture was stirred for an additional 30 minutes. The chloroform was then decanted, and methanol (100 mL) added to dissolve the solid. The methanol solution was subsequently poured into a large dish (250 mm diameter), and the methanol was allowed to evaporate at room temperature. A thin film of the polymer formed. The polymer film was subsequently cut into small pieces, and the small pieces soaked 5 times in deionized water or until the water was no longer acidic. The solid polymer was subsequently soaked in a LiOH solution (2.0 M) overnight, then filtered and washed with distilled water and dried in a vacuum oven at 35-40° C. for 24 hours to provide SPPO (15 g). The $^1$H NMR ((CD$_3$)$_2$SO) is shown in FIG. 1.

Example 2

Synthesis of Brominated PPO (BPPO)

Figure 2:
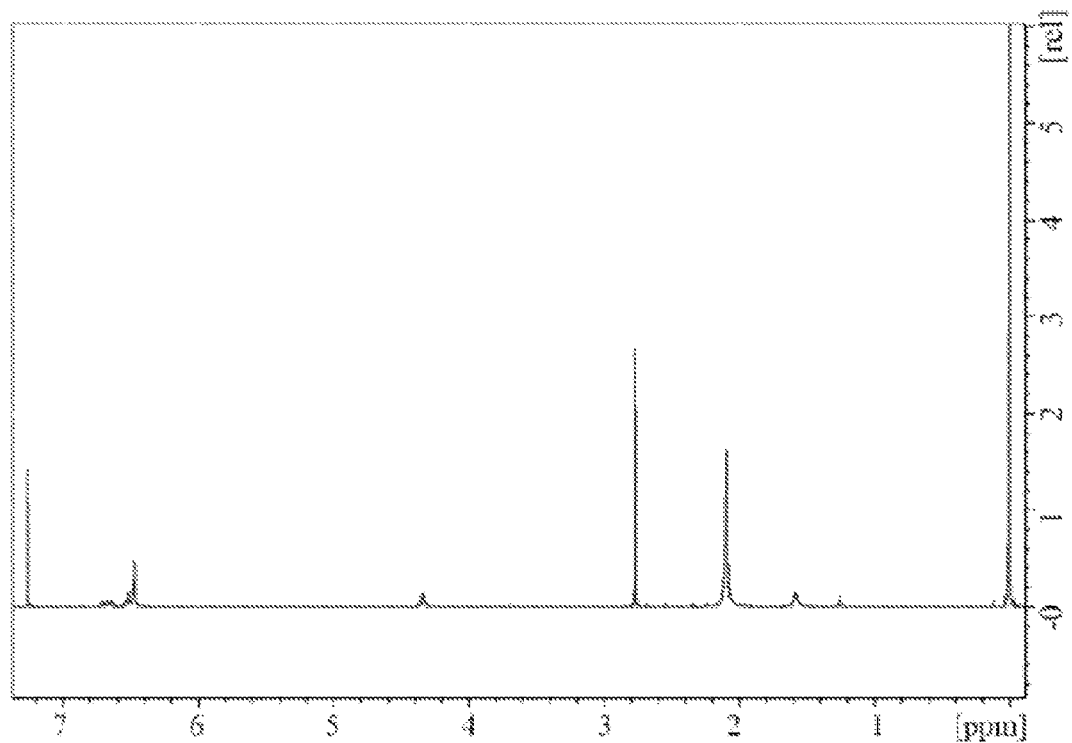
FIG. 2 is a $^1$H NMR of brominated poly(2,6-dimethyl-1,4-phenylene oxide), according to the Examples.

To a solution of PPO (10 g) in benzene (150 mL) was added 2,2'-azobis(2-methylpropionitrile) (AIBN; 0.250 g), followed by heating the solution in an oil bath to about 80° C. N-bromosuccinimide (NBS; 5.939 g) was then added in one portion. The reaction mixture was brought to reflux and held overnight. After cooling to room temperature, the solution was washed twice with water, and then the organic solution was slowly added to methanol (300 mL) while stirring to precipitate the product. The solid product was then collected by filtration and washed with methanol. After drying overnight at 80° C., BPPO (11.7 g) was obtained as a gray solid. The $^1$H NMR (CDCl$_3$) is shown in FIG. 2.

Example 3

Synthesis of Esterified PPO (EPPO)

Figure 3:
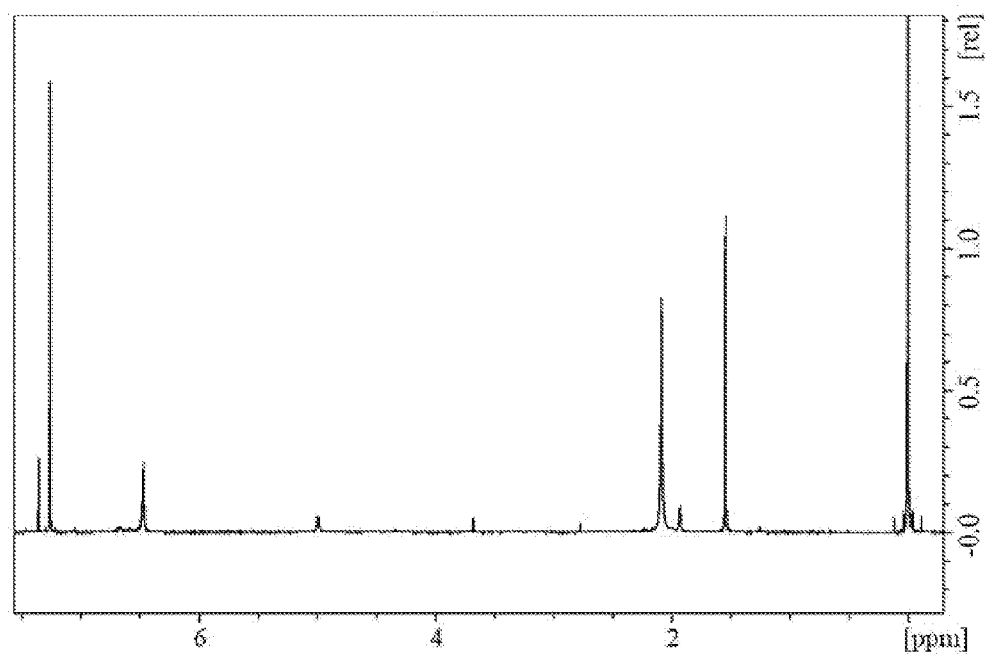
FIG. 3 is a $^1$H NMR of an acetate ester modified poly(2,6-dimethyl-1,4-phenylene oxide), according to the Examples.

To a solution of BPPO (2 g) in benzene (30 mL), was added potassium acetate (1.089 g) and 18-crown-6 ether (5 g). The reaction mixture was then heated to 80° C. and allowed to proceed overnight. After the mixture was cooled to room temperature, the mixture was added to methanol (200 mL) slowly while stirring to precipitate a solid. The solid was then collected by filtration and washed with methanol. After drying overnight at 80° C., EPPO (1.8 g) was obtained as a gray solid. The $^1$H NMR (CDCl$_3$) of EPPO is shown in FIG. 3.

Example 4

$^7$Li NMR Characterization of the SLMP

Li$_2$CO$_3$ coated SLMP particles were suspended in anhydrous p-xylene, and a $^7$Li NMR spectrum was recorded and compared with the $^7$Li NMR spectrum of Li$_2$CO$_3$ suspension in anhydrous p-xylene. The $^7$Li NMR spectrum of Li$_2$CO$_3$ exhibits a single broad peak at 0.55 ppm. The $^7$Li NMR spectrum of the Li$_2$CO$_3$ coated SLMP particles displays a large peak at 265.5 ppm and a peak at 1.37 ppm that is 3.3% of the area of the peak at 265.5 ppm. These spectra indicate that Li$_2$CO$_3$ coated SLMPs contain a majority of lithium metal and a small amount of lithium compounds such as Li$_2$CO$_3$.

Example 5

Demonstration of Incompatibility of Lithium Salt Coated SLMPs with NMP

To demonstrate the incompatibility of lithium salt coated SLMPs with NMP in a controlled manner, Li$_2$CO$_3$ coated SLMPs (21.6 mg) were added to NMP (5 mL) inside an argon-filled glovebox and the resulting mixture stirred for 24 hours. The release of hydrogen gas was noted and the volume of hydrogen gas generated was measured using a gas evolution apparatus. Upon reaching 24 hours of stirring, the Li content of the mixture was tested by adding water and measuring the volume of hydrogen gas generated. The mixture was found to contain a Li metal content of only 7.8%. The experiment confirms that lithium salt coated SLMPs and NMP are incompatible.

Example 6

Slurry Approach to Prepare PPO/SLMP-Containing Laminate Under Ambient Conditions (MCMB:CB:PPO:SLMP=84:4:10:2)

MCMB (84 wt %), carbon black (4 wt %), and PPO (10 wt %) were mixed together inside an argon-filled glovebox with enough dichlorobenzene to make a medium viscosity slurry solvent, followed by addition of the slurry and Li$_2$CO$_3$ coated SLMP (2 wt %) to a container. An additional amount of the dichlorobenzene was added to adjust the viscosity of the resultant slurry. The container was then capped and mixed to obtain a homogeneous slurry. The slurry was then coated onto a copper foil using an automatic coater, and dried in oven at 75° C. for 1 hour, followed by drying overnight under dynamic vacuum to provide an electroactive laminate.

Example 7

MCMB electrodes without SLMPs were prepared according to Example 5 and were of the following composition: MCMB (86 wt %), carbon black (4 wt %), and PPO (10 wt %).

Example 8

Ground Slurry Approach to Prepare PPO/SLMP-containing Laminate (MCMB:CB:PPO:SLMP=84:4:10:2). Inside an argon-filled glovebox, a mixture of MCMB (84 wt %), carbon black (4 wt %), and PPO (10 wt %) were mixed together with enough dichlorobenzene to make a medium viscosity slurry and added to a mortar. The mixture was then ground using a pestle to obtain a homogeneous slurry. SLMP (2 wt %) was then added to the slurry and mixed with a soft spatula. The slurry was coated onto a copper foil using a doctor blade, dried in a vacuum oven at 65° C. for 1 hour, and then further dried under dynamic vacuum overnight to provide an electroactive laminate.

Example 9

Electrodes using SPPO or EPPO instead of PPO were prepared using the same procedure as in Example 8.

Example 10

MCMB electrodes without SLMPs were prepared according to the ground slurry approach of Example 8. The electrodes had the following composition: MCMB (86 wt %), carbon black (4 wt %), and PPO (10 wt %).

Example 11

MCMB electrodes without SLMPs and using SPPO instead of PPO were prepared according to the ground slurry approach of Example 10. The electrodes had the following composition: MCMB (86 wt %), carbon black (4 wt %), and SPPO (10 wt %).

Example 12

MCMB electrodes without SLMPs and using EPPO instead of PPO were prepared according to the ground slurry approach of Example 10. The electrodes had the following composition: MCMB (86 wt %), carbon black (4 wt %), and EPPO (10 wt %).

Example 13

Chemical Activation of SLMP

The laminates of Example 5 were cut into a size suitable as an anode. The anodes were then soaked in a 4 wt % solution of tris(pentafluorophenyl)borane (an anion receptor) in 3/7 (w/w) EC/EMC for 12 hours. After removal from the solution of anion receptor, the solvents were allowed to evaporate to provide activated electroactive laminates ready for use in battery assembly.

Example 14

Figure 4:
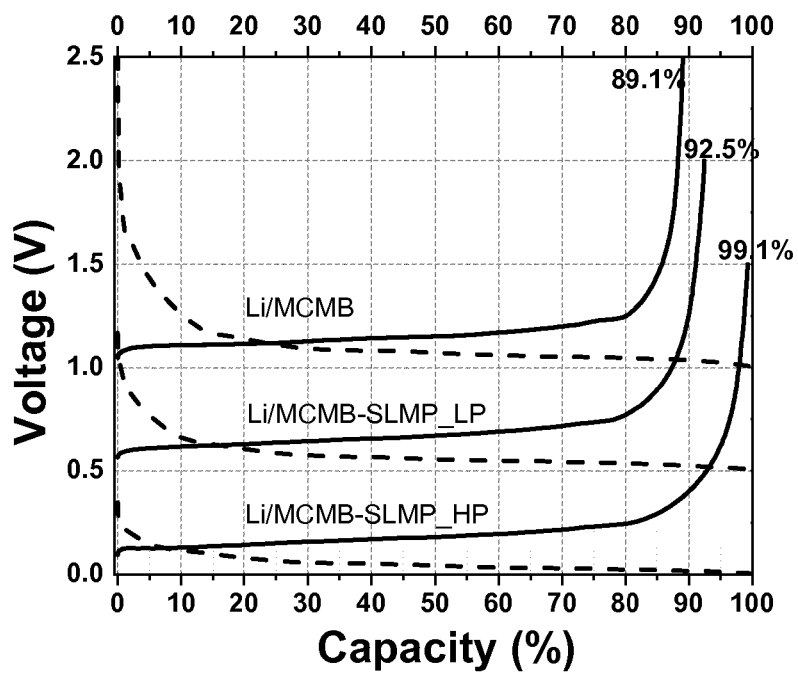
FIG. 4 is a graph of the charge-discharge profiles of half cells with electrodes made from graphitized meso-carbon microbeads and SLMP (MCMB-SLMP) in comparison with a half cell with a MCMB electrode, according to the Examples.

MCMB-SLMP laminates prepared according to Example 6 was compressed under two different pressures: MCMB-SLMP_LP was compressed by a rolling mill to achieve about a 15% reduction of the laminate thickness, while MCMB-SLMP_HP was compressed by a rolling mill to achieve about a 30% reduction of the laminate thickness. Half cells were then prepared with the MCMB-SLMP_LP and MCMB-SLMP_HP electrodes using an electrolyte of 1.2 M $LiPF_6$ in 3/7 (w/w) EC/EMC. Half cells were also prepared with the MCMB electrodes of Example 7 and the same electrolyte. FIG. 4 shows the charge-discharge profiles of each of these half cells. Note that the data for these different cells is shifted along y-axis to allow for comparison, and that the placement of one above the other is not necessarily indicative of an overall higher voltage of one cell over another. The charge-discharge profiles of these half cells indicate that the first cycle capacity loss of the graphite electrode is reduced in the MCMB-SLMP electrodes in comparison to the MCMB electrode.

Example 15

Figure 5A:
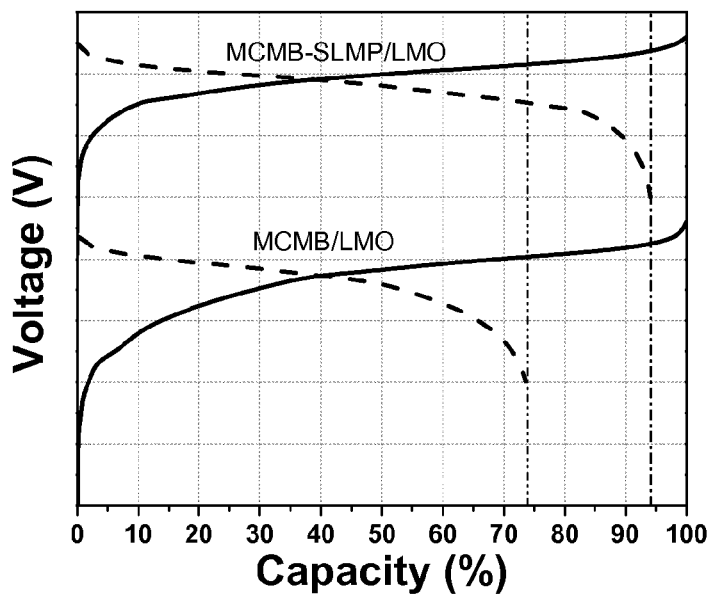
FIGS. 5A and 5B are graphs of the charge-discharge profiles of MCMB-SLMP/$Li_2MnO_4$ (LMO) and MCMB/LMO cells (FIG. 5A) and the charge-discharge cycling performance of a MCMB-SLMP/LMO cell (FIG. 5B), according to the Examples.
Figure 5B:
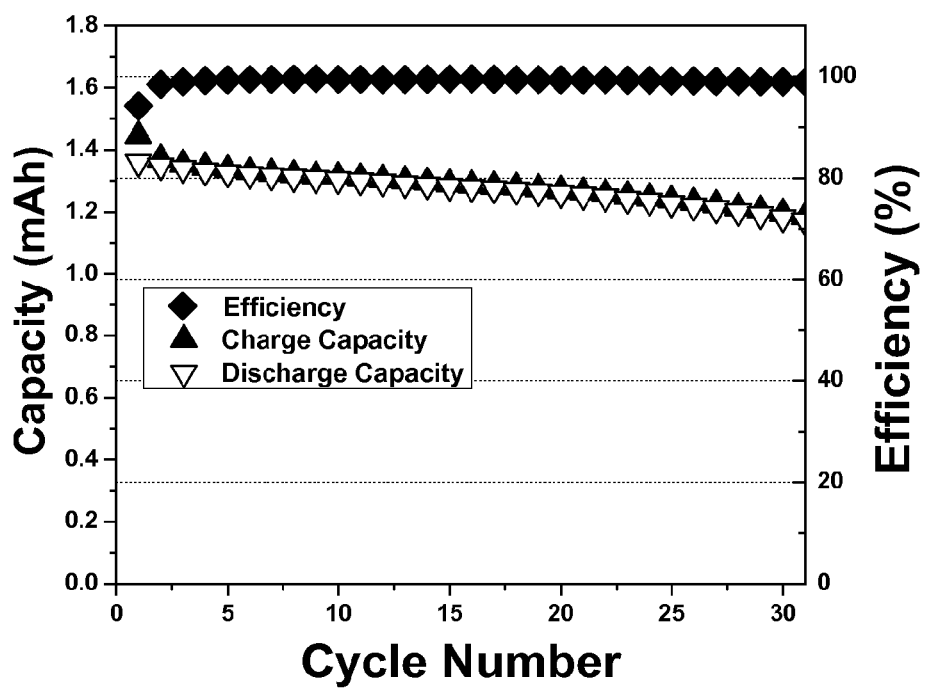

A MCMB-SLMP electrode prepared according to Example 6 was compressed by a rolling mill to achieve about a 30% reduction of the laminate thickness and assembled into a coin cell type battery with a $Li_2MnO_4$ (LMO) cathode and an electrolyte of 1.2 M $LiPF_6$ in 3/7 (w/w) EC/EMC. A coin cell type battery with a MCMB electrode of Example 7, a LMO cathode, and 1.2 M $LiPF_6$ in 3/7 (w/w) EC/EMC was also prepared for comparison. As shown in FIG. 5A, the charge-discharge profiles of the batteries indicated that first cycle capacity loss of the MCMB-SLMP containing battery is greatly reduced compared to the MCMB/LMO battery. The cycle performance of the MCMB-SLMP/LMO battery is shown in FIG. 5B.

Example 16

Figure 6A:
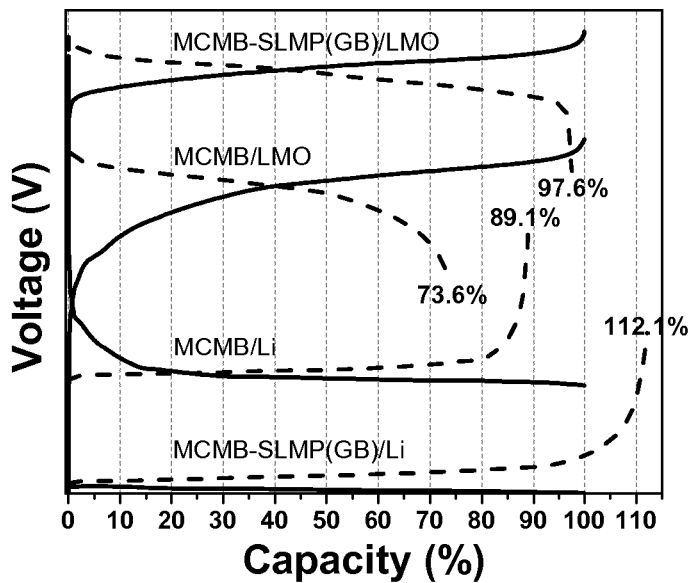
FIGS. 6A and 6B are graphs of the charge-discharge profiles of MCMB/Li and MCMB-SLMP/Li half cells where the MCMB was ground before forming the electrode ("MCMB-SLMP(GB)/Li") along with MCMB/LMO and MCMB-SLMP(GB)/LMO full cells (FIG. 6A), as well as the charge-discharge cycling performance of a MCMB-SLMP(GB)/LMO cell (FIG. 6B), according to the Examples.
Figure 6B:
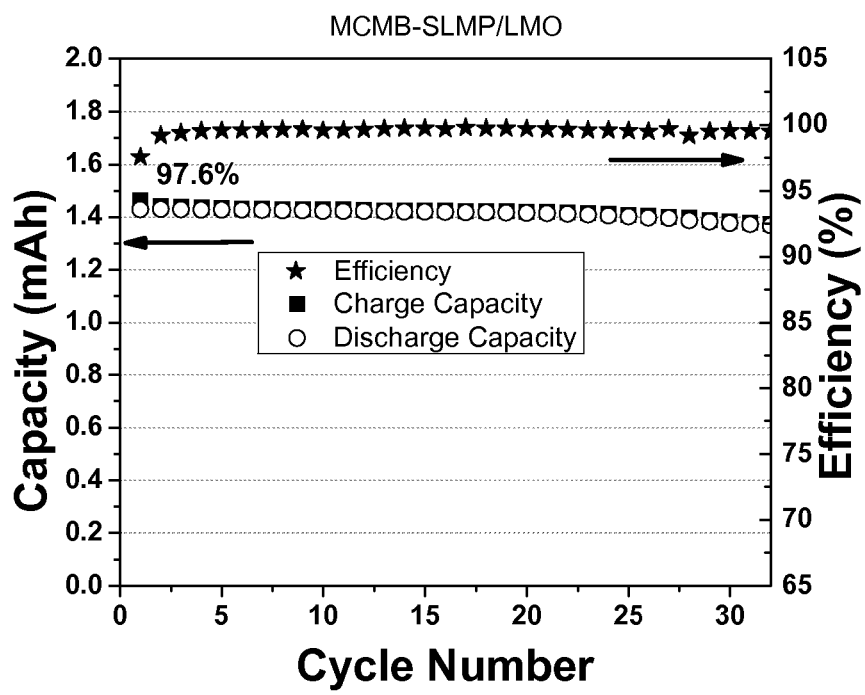

A MCMB-SLMP electrode, prepared according to ground slurry procedure of Example 8 ("MCMB-SLMP(GB)"), was compressed to achieve about a 30% reduction of the laminate thickness and assembled into a coin cell type battery with Li (half cell) or LMO (full cell) electrode using 1.2 M $LiPF_6$ in 3/7 (w/w) EC/EMC. The MCMB electrodes of Example 10 were also assembled into a coin cell type battery with a Li or LMO electrode for comparison. When comparing MCMB-SLMP(GB)/Li and MCMB/Li (FIG. 6A), the charge-discharge profiles of these batteries illustrate that first cycle capacity loss of a half cell is completely removed by using a MCMB-SLMP electrode. The efficiency of the MCMB-SLMP/Li was higher than 100% due to partial lithiation of the graphite. The first cycle capacity loss of a full cell MCMB-SLMP/LMO is also greatly reduced compared to MCMB/LMO. The cycle performance of the MCMB-SLMP/LMO battery is shown in FIG. 6B.

Example 17

Figure 7A:
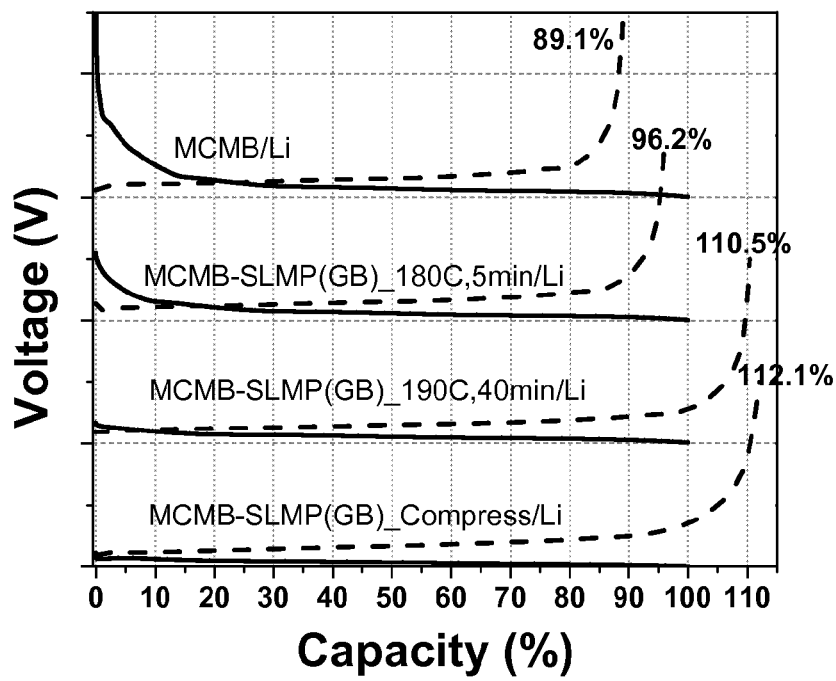
FIGS. 7A and 7B are graphs of the charge-discharge profiles of heat and compression activated MCMB-SLMP(GB)/Li half cells in comparison with a MCMB/Li half cell (FIG. 7A), and the charge-discharge cycling performance of the MCMB-SLMP(GB)/Li half cells (FIG. 7B), according to the Examples.
Figure 7B:
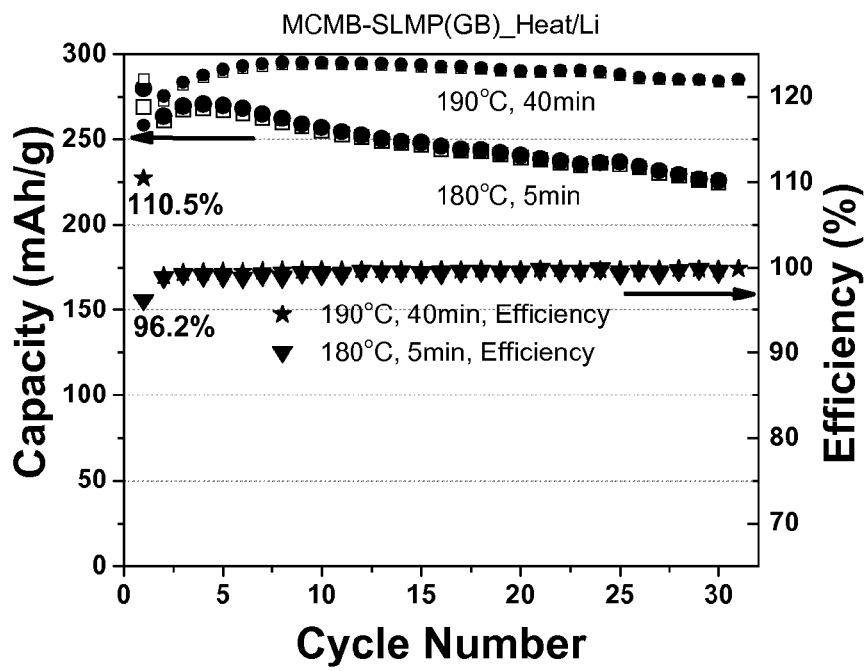

MCMB-SLMP(GB) electrodes, prepared according to Example 8, were heated at either 180° C. for 5 minutes or 190° C. for 40 minutes, as indicated in FIG. 7A. Another MCMB-SLMP(GB) electrode was compressed by a rolling mill to achieve about a 30% reduction of the laminate thickness. These electrodes were then assembled into coin cell type batteries with Li using 1.2 M $LiPF_6$ in 3/7 (w/w) EC/EMC. The charge-discharge profiles are compared with a MCMB/Li battery formed with the electrode of Example 10. The charge-discharge profiles of the MCMB-SLMP(GB) batteries indicate that first cycle capacity loss of a half cell could be greatly reduced or completely removed. The values higher than 100% are due to partial lithiation of the graphite. The cycle performance of the two heat-activated MCMB-SLMP/Li batteries is shown in FIG. 7B.

Example 18

SPPO and EPPO containing electrodes, prepared according to Example 9, were independently compressed by a rolling mill to achieve about a 30% reduction of the laminate thickness. These electrodes were then assembled into coin cell type batteries with Li using 1.2 M $LiPF_6$ in 3/7 (w/w)

Figure 8A:
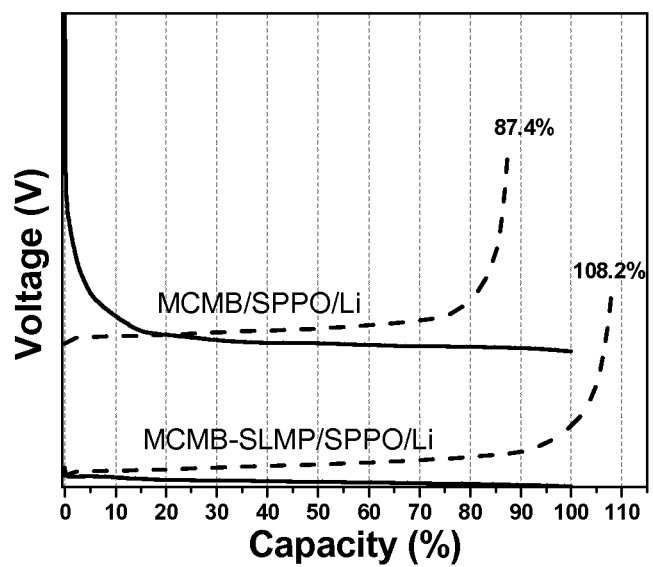
FIGS. 8A and 8B are graphs of the charge-discharge profiles of a MCMB-SLMP/SPPO/Li half cell in comparison with a MCMB/SPPO/Li half cell (FIG. 8A), and the charge-discharge profiles of a MCMB-SLMP/EPPO/Li half cell in comparison with a MCMB/EPPO/Li half cell (FIG. 8B), according to the Examples.
Figure 8B:
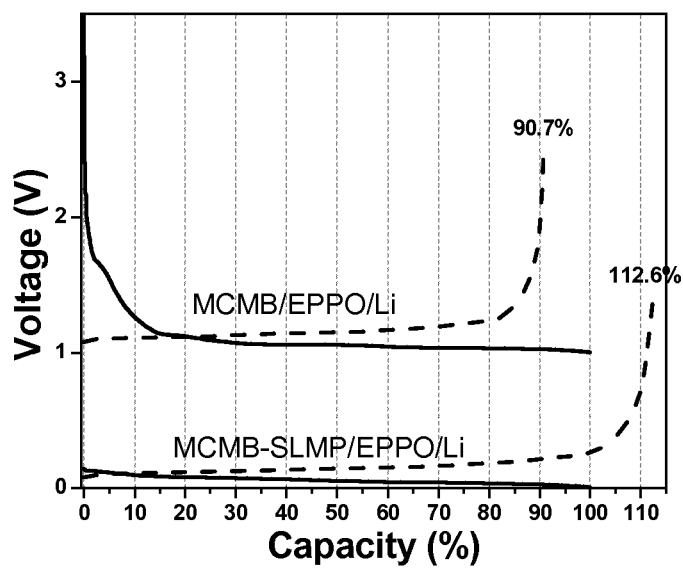

EC/EMC. The charge-discharge profiles of the MCMB-SLMP/SPPO/Li battery in comparison with a MCMB/SPPO/Li battery formed with the electrode of Example 11 is shown in FIG. 8A. The charge-discharge profiles of the MCMB-SLMP/EPPO/Li battery in comparison with a MCMB/EPPO/Li battery formed with the electrode of Example 12 is shown in FIG. 8B.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. An electroactive composition comprising:
   an anodic material;
   a poly(arylene oxide); and
   stabilized lithium metal particles;
   wherein the stabilized lithium metal particles:
      have a size less than about 200 μm in diameter;
      are coated with a lithium salt;
      are present in an amount of about 0.1 wt % to about 5 wt %; and
      are dispersed throughout the composition; and
   wherein the poly(arylene oxide) comprises a compound according to Formula II:

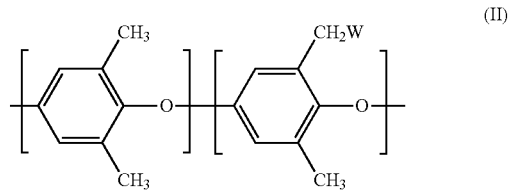

wherein:
   W is cyano or $OC(O)R^7$; and
   $R^7$ is alkyl.

2. The electroactive composition of claim 1, wherein W is cyano, $OC(O)CH_3$, $OC(O)CH_2CH_3$, $OC(O)CH_2CH_2CH_3$, $OC(O)CH(CH_3)_2$, or $OC(O)CH_2CH_2CH_2CH_3$.

3. The electroactive composition of claim 1, wherein the anodic material comprises $Li_4Ti_5O_{12}$, Sn, tin oxide, tin alloys, Se, Si, Si—C, silicon oxide, silicon alloys, Sb, intermetallic compounds, Si, Si—C, an antimony alloy, a composite tin alloy, natural graphite, hard carbon, soft carbon, carbon black, petroleum coke, artificial graphite, graphitized mesocarbon microbeads, graphite fibers, graphene, graphene oxide, carbon nanotubes, or amorphous carbon.

4. The electroactive composition of claim 1, wherein the poly(arylene oxide) is present in an amount of about 0.1 wt % to about 30 wt %.

5. A lithium secondary battery comprising:
   a cathode comprising a cathodic material;
   an anode comprising the electroactive material of claim 1; and
   a non-aqueous electrolyte.

6. The lithium secondary battery of claim 5, wherein the cathode is a non-lithiated cathode comprising a non-lithiated cathodic material.

7. The lithium secondary battery of claim 6, wherein the non-lithiated cathodic material comprises $MnO_2$, $V_2O_5$, $V_6O_{13}$, $MoS_2$, $FeS_2$, S, $FeF_3$, or $FeF_2$.

8. A process comprising:
    generating a slurry comprising:
        an anodic material;
        a binder comprising a poly(arylene oxide),
        a liquid; and
        a stabilized lithium metal particle;
    coating the slurry onto a metal substrate; and
    drying the slurry to provide an electroactive material;
    wherein:
        the stabilized lithium metal particles
            have a particle size of less than about 200 μm;
            are coated with a lithium salt; and
            are present in an amount of about 0.1 wt % to about 5 wt % relative to the anodic material and the binder;
        the poly(arylene oxide) comprises a compound according to Formula II:

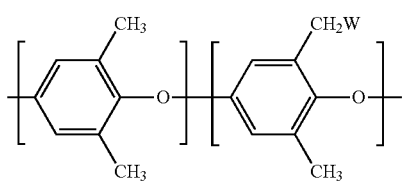

(II)

wherein:
    W is cyano or OC(O)R$^7$;
    R$^7$ is alkyl; and
    the liquid comprises a hydrocarbon solvent, an aromatic solvent, a sulfone, or a sulfoxide.

9. The process of claim 8, wherein W is cyano, OC(O)CH$_3$, OC(O)CH$_2$CH$_3$, OC(O)CH$_2$CH$_2$CH$_3$, OC(O)CH(CH$_3$)$_2$, or OC(O)CH$_2$CH$_2$CH$_3$.

10. The process of claim 8, further comprising activating the electroactive material chemically, physically, or thermally.

11. The process of claim 10, wherein the activating step comprises compressing the electroactive material to achieve at least about a 10% reduction in the thickness of the electroactive material.

12. The process of claim 10, wherein the activating step comprises heating the electrode at a temperature of about 100° C. to about 220° C. for a duration of about 5 minutes to about 120 minutes.

13. The process of claim 10, wherein the activating step comprises contacting the electroactive material with a non-aqueous electrolyte.

14. The process of claim 8, the poly(arylene oxide) is present in an amount of about 0.1 wt % to about 30 wt % relative to the anodic material and the stabilized lithium metal particles.

15. An electroactive composition comprising:
    an anodic material;
    a poly(arylene oxide); and
    stabilized lithium metal particles;
    wherein the stabilized lithium metal particles:
        have a size less than about 200 μm in diameter;
        are coated with a lithium salt;
        are present in an amount of about 0.1 wt % to about 5 wt %; and
        are dispersed throughout the composition; and
    wherein the poly(arylene oxide) comprises a compound according to Formula I:

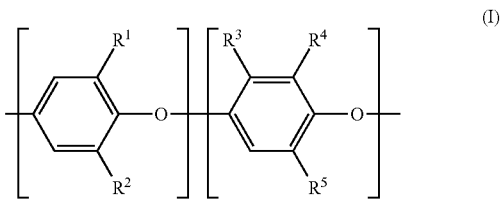

wherein:
    R$^1$ is alkyl;
    R$^2$ is H or alkyl;
    R$^3$ is SO$_3$X or C(O)OY;
    R$^4$ is CH$_2$R$^6$;
    R$^5$ is H or alkyl;
    R$^6$ is OC(O)R$^7$, cyano, or SO$_3$X;
    X is Li, Na, K, or methyl;
    Y is C(O)R$^7$, alkyl, Li, Na, or K; and
    R$^7$ is alkyl.

16. The electroactive composition of claim 15, wherein R$^3$ is C(O)OY.

17. The electroactive composition of claim 15, wherein
    R$^3$ is C(O)OY; and
    R$^6$ is OC(O)R$^7$ or cyano.

18. An electroactive composition comprising:
    an anodic material;
    a poly(arylene oxide); and
    stabilized lithium metal particles;
    wherein the stabilized lithium metal particles:
        have a size less than about 200 μm in diameter;
        are coated with a lithium salt;
        are present in an amount of about 0.1 wt % to about 5 wt %; and
        are dispersed throughout the composition; and
    wherein the poly(arylene oxide) comprises a compound according to Formula III:

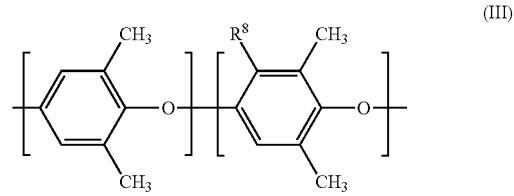

wherein:
    R$^8$ is C(O)OY;
    Y is C(O)R$^7$, alkyl, Li, Na, or K; and
    R$^7$ is alkyl.

19. A lithium secondary battery comprising:
    a cathode comprising a cathodic material;
    an anode comprising the electroactive material of claim 15; and
    a non-aqueous electrolyte.

20. A lithium secondary battery comprising:
    a cathode comprising a cathodic material;
    an anode comprising the electroactive material of claim 18; and
    a non-aqueous electrolyte.

* * * * *